Nov. 7, 1939.  W. J. CRITES ET AL  2,178,931
COMBINATION FLUID CONDUIT AND ELECTRICAL CONDUCTOR
Filed April 3, 1937
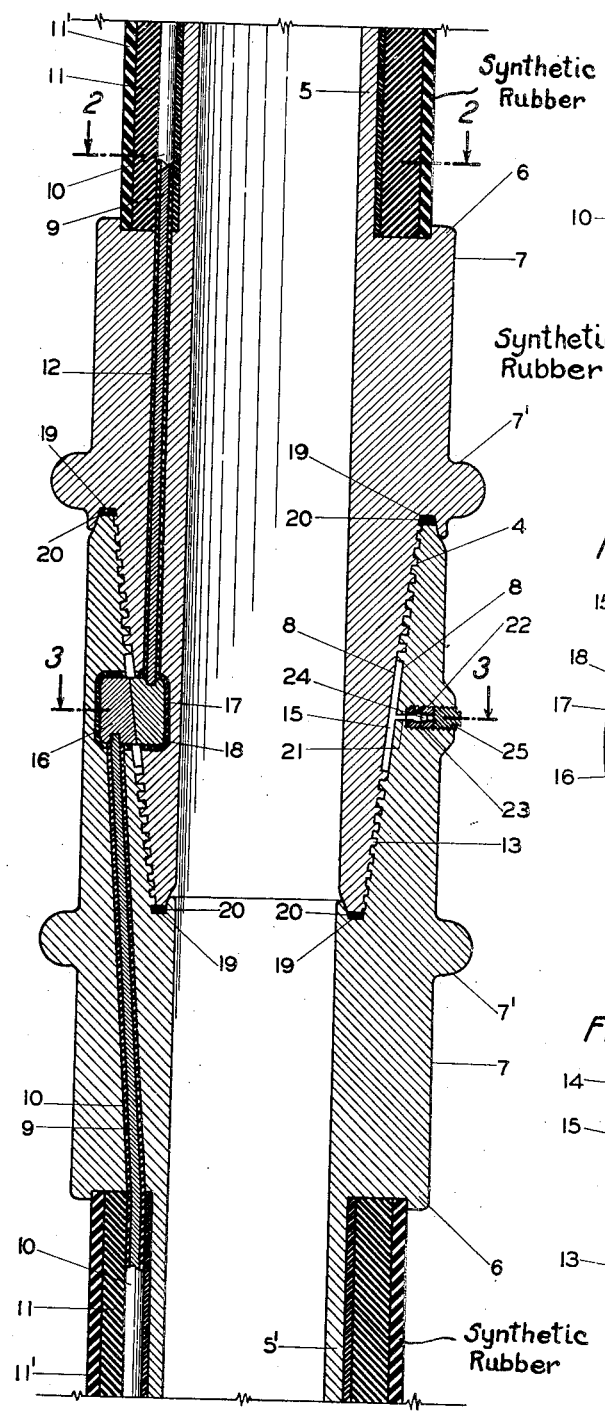
FIG. 1
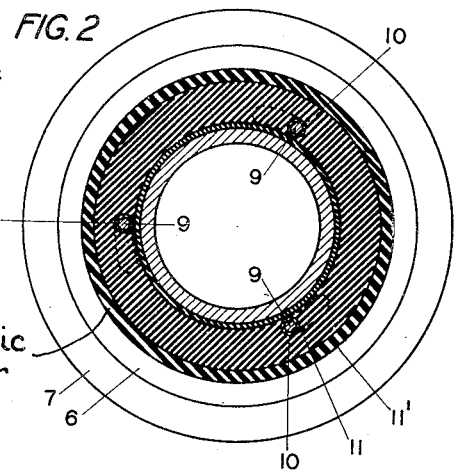
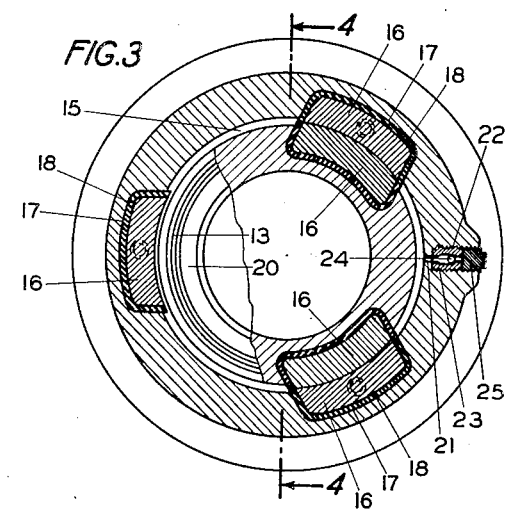
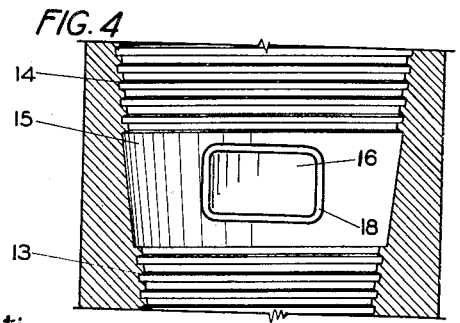
INVENTOR.
WILBUR J. CRITES
DONALD R. KNOWLTON
BY
ATTORNEYS.

Patented Nov. 7, 1939

2,178,931

UNITED STATES PATENT OFFICE 2,178,931

COMBINATION FLUID CONDUIT AND ELECTRICAL CONDUCTOR

Wilbur J. Crites and Donald R. Knowlton, Bartlesville, Okla., assignors to Phillips Petroleum Company, a corporation of Delaware Application April 3, 1937, Serial No. 134,866

4 Claims. (Cl. 173—326)

This invention relates to apparatus for power transmission to electrical subsurface equipment.

In the oil industry, many forms of subsurface equipment include as a part thereof electric motors. It is known to be old to drive submerged centrifugal pumps, and suspended drilling equipment by electric motors structurally associated with and adjacent the pump or drill in the well hole. In such cases a conduit usually a tubing string is associated with the equipment to conduct fluid to or from it. In the case of drilling equipment the fluid may be drilling mud or a gas under pressure. In the case of a pump, the fluid may be the liquid to be raised to the surface or a gas under pressure to assist the pump in raising the liquid.

It has been the practice to convey the energy to the electrical equipment in a well hole by means of an electric cable. This required that as the tubing connected to the equipment was lowered into the well and cable was unreeled and clipped or otherwise fastened to the tubing. This greatly complicated the task of running and pulling tubing. In wells the size of the cable including its insulation was limited by the difference in diameter between the tubing or flow string and surrounding casing. The layers of insulation and protective material making up the cable were of substantial thickness resulting in a necessarily small diameter conductor. This in turn necessitated higher voltages to avoid prohibitive power loses, resulting in insulation failures. It often happens that a tubing string, thousands of feet long, parts either at a joint or an intermediate portion due to the great weight involved. In such cases where the cable was clipped to the tubing the cable broke also but not necessarily at the same point as the tubing parted. The result was that great lengths of cable were torn away from their fastening to the tubing string and fell into the well hole. Recovering this cable was a particularly difficult fishing job. In many instances it was impossible to remove the cable and in such cases the well had to be abandoned.

The present invention seeks to do away with the difficulties surrunding the use of cable. It is proposed to incorporate the conductors for conveying energy to the equipment into the tubing string itself with means at each joint of tubing to connect the conductors incorporated in the two sections since the tubing and conductor will be made up in the same operation on lowering the tubing string into the well. The conductors are spaced around the tubing so that much more room is available between the tubing and the casing for a larger conductor. Since the conductor and tubing are incorporated, if the tubing parts the conductor parts at approximately the same point and the conductor and tubing on both sides of the break remain together.

The present invention is also applicable to operations in mining for oil where electric motors are used in conjunction with subsurface equipment and power must be brought from the surface to points in the shaft drifts or laterals.

An important object of the present invention is to provide a tubing for use in a deep well or shaft in which is incorporated conductors for conveying energy to subsurface equipment.

A further important object of this invention is to provide for the elimination of a separate and distinct cable for power transmission which allows for an increase in the size of the conductor and thereby provides for less loss in power transmission.

A further important object of this invention is to provide a means of power transmission to subsurface equipment which will eliminate the use of cables which may result in plugging the hole.

A further important object of this invention is to provide a means which will eliminate the present hazards encountered in the use of a cable and particularly to eliminate the hazards resulting from the disruption of the cable insulation.

A further important object of this invention is to incorporate electrical conductors which carry the energy to the subsurface equipment with the tubing string provided for the flow of fluids from the subsurface equipment which will allow for the use of larger electrical conductors and permit the use of larger tubing.

Referring to the drawing forming a part of this specification in which like numerals are employed to designate like parts throughout the same, Fig. 1 is a view in longitudinal section of a structure embodying the invention, Fig. 2 is a view in cross section taken on a line 2, 2 of Fig. 1, Fig. 3 is a view partly in cross section taken on line 3, 3 of Fig. 1 having parts broken away, and Fig. 4 is a view in longitudinal cross section taken through the female joint member of a section of tubing.

In the drawing wherein for the purpose of illustration is shown a preferred embodiment of my invention, numeral 5 designates a section of tubing adjacent the male joint member and numeral 5' a section of tubing adjacent the female joint member, the two sections being joined in a specially constructed joint. This joint is formed by building up the ends of each section of tubing so as to form a thickened wall, presenting shoulders 6, 6 the purpose of which will be later described, tonging surfaces 7, 7 associated with tonging shoulders 7', 7' and a special threaded portion designated generally at 8, 8. Conductors 9 surrounded by insulation 10 are positioned contiguous to each tubing section throughout its length. These conductors may wind spirally around the tubing if desired. Further they may be of any desired shape, round, as shown, elliptical or arcuate, so as to obtain the desired cross section of conducting material with a small dimension along the diameter of the tubing. These conductors 9 are embedded or wrapped in a layer of insulation 10. This insulation may be molded rubber composition, Bakelite or any desirable kindred material; however the invention is not limited to such form of insulation since if desired impregnated linen wrapping or other fabric may be used. Surrounding insulation body 10 is an external protecting layer 11 resistant to conditions in the well bore, and 11' is a layer of abrasive or wear resistant material, synthetic rubber having been found suitable for the purpose. At the ends of each section of tubing, conductor 9 with its insulation 10 enters a bore 12 in the built up section of the pipe end. Insulation layers 10 and 11 are terminated under shoulder 6 and hermetically sealed thereto in any desired manner.

Threaded portions 8, 8 comprise two spaced sets of threads 13 and 14 of the square tapered type. Between these two sets of threads 13 and 14 an annular recess 15 is formed by the omission of threads. In the joint member of each section of tubing are positioned three electrical contacts 16 spaced 120 degrees apart and positioned in cavities 17 so as to project into recess 15 when the sections of tubing are assembled. These contacts 16 can be mounted in cavity 17 by being embedded in live rubber 18 or in any manner which will resiliently hold them in position. Bores 12 extend through the joint to cavity 17 so that conductors 9 can be attached to their associated contacts by threading, brazing or any other desired manner. Each threaded portion 8 has in its internal end an annular recess 19 which holds gaskets 20 for sealing the joint. Communicating with recess 15 is a passage 21 in the female joint member of each section of tubing which in turn communicates with the exterior of the tubing through a threaded bore 22. A fitting 23 equipped with a check valve 24 is threaded in bore 22. A screw threaded plug 25 closes the bore.

Each section of tubing as above described with the conductors incorporated therein is used in the field in the same manner as the usual length of tubing, thus in running the tubing string into a well a section of the above described tubing is grasped on the tonging surfaces 7 by elevators and the tubing lowered into the well until the end is in a position for joining another section to it. The second section is lowered until its threaded portion 8 is in thread engaging position with the threaded portion 8 of the first tubing section and the joint is made up in the usual manner. As the threads in the two sections take hold the contacts 16 on each tubing section end rotate by one another. The resilient mounting 18 allows each contact to give as it rubs and presses against an adjacent contact resulting in a scouring action. The contacts 16 are so positioned that when the joint is approximately made up each contact in each tubing section end will be in alignment with a contact on the associated tubing section end. A reference mark can be placed on the exterior of the two tubing section ends to show when the contacts coincide. Due to the gaskets 20 there will be sufficient leeway in the sealing action of the joint to permit this procedure. With the tubing joint made up, plug 25 is removed and a pressure applicator fitting threaded into the bore 22. Liquid or semi-liquid insulating and sealing material is then applied under pressure through the fitting and flows into an inner recess 15 insulating the contacts 16 against fluids in the well or tubing which might possibly pass the gaskets 20. A pressure gauge on the insulating material applicator would show whether or not the joint was improperly made up since the insulating material leaking past the threads and gaskets would allow a drop in pressure in the annular recess 15. When sufficient insulating material has been forced into the joint the applicator fitting is removed and plug 25 inserted. Check valve 24 will prevent the insulating material from being extruded when the pressure applicator fitting is removed.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

We claim:

1. In a tubing joint, a section of tubing having a joint member, a second section of tubing having a joint member overlaying said first mentioned joint member, a screw threaded section in each said joint member in cooperative relationship, said joint members having aligned sections spaced from one another to form an annular recess, a contact mounted on said first mentioned joint member, a juxta-opposed contact mounted on said second joint member, said contacts being positioned in said recess, a passage connecting said recess and the exterior of said joint, a flowable insulating material in said recess, and a check valve in said passage.

2. In a rigid tubing section for use in oil field operations having a screw threaded socket on one end and a screw threaded pin on the other, an electrical conductor mounted in the wall of a tubing section, electrical contact means attached to the ends of the conductor and insulated from the tubing section, the screw threads on the ends of the tubing being interrupted transversely of the pin and socket as well as longitudinally thereof to form a recess within the threaded area on each end, and the electrical contact means being located in the recesses.

3. In a rigid tubing joint for use in oil field operations, a section of tubing having a male threaded portion, a second section of tubing having a female threaded portion, said threaded portions being in engagement to form a sealed joint, the screw threads on the male and female portions being interrupted transversely as well as longitudinally thereof to form complementary recesses, electrical contact means mounted in the recesses insulated from the tubing and in engagement with one another when the joint is assembled and an electrical conductor located in the wall of the tubing connected to each contact.

4. In a rigid tubing joint for use in oil field operations a section of tubing having a male threaded portion, a second section of tubing having a female threaded portion, said threaded portions being in engagement to form a sealed joint, the screw threads on the male and female portions being interrupted transversely as well as longitudinally thereof to form complementary recesses, electrical contact means mounted in the recesses insulated from the tubing and in engagement with one another when the joint is assembled, an electrical conductor located in the wall of the tubing connected to each contact, and a fluid insulating medium filling the recesses in the male and female members when the joint is assembled.

WILBUR J. CRITES.
DONALD R. KNOWLTON.